United States Patent [19]
Johnson

[11] Patent Number: 5,383,974
[45] Date of Patent: Jan. 24, 1995

[54] METHOD FOR REJUVENATING A DRAINFIELD OR DRY WELL

[76] Inventor: Edward P. Johnson, 28082 Oaklands Cir., Easton, Md. 21601

[21] Appl. No.: 69,585

[22] Filed: Jun. 1, 1993

[51] Int. Cl.⁶ .............................................. B08B 5/04
[52] U.S. Cl. ............................ 134/21; 134/22.1; 134/22.18; 134/37; 134/102.2; 134/167 R
[58] Field of Search ............... 134/22.1, 22.12, 22.18, 134/24, 21, 37, 42, 102.2, 166 R, 167 R, 184; 239/272; 210/610, 747

[56] References Cited

U.S. PATENT DOCUMENTS

| | | | |
|---|---|---|---|
| 2,528,403 | 10/1950 | West | 210/610 |
| 3,202,285 | 8/1965 | Williams | 210/195 |
| 3,658,589 | 4/1972 | Shaddock | 134/21 X |
| 4,201,597 | 5/1980 | Armstrong et al. | 134/167 R |
| 4,525,277 | 6/1985 | Poulin | 210/747 |
| 4,824,563 | 4/1989 | Iwahori et al. | 210/195.1 |
| 4,925,564 | 5/1990 | Francis | 210/610 |
| 5,228,998 | 7/1993 | Diclemente et al. | 210/610 |

Primary Examiner—Melvyn J. Andrews
Assistant Examiner—Saeed Chaudhry
Attorney, Agent, or Firm—Kirkland & Ellis

[57] ABSTRACT

A method and apparatus is provided for cleaning and rejuvenating septic tank sewage systems. Where the septic tank has a drainfield associated therewith, the method comprises penetrating the ground near a drainfield lateral, and agitating the area near the drainfield lateral while simultaneously applying suction to the drainfield lateral. Accumulated scum and waste is thereby removed from the drainfield lateral. Where the septic tank system has a dry well associated therewith, the method comprises penetrating the bottom of the dry well and agitating the area underneath the dry well to form accumulated scum and waste into a froth or malt at the bottom of the dry well, and removing the froth or malt by suction. The apparatus of the present invention comprises a penetrating nozzle attached to an articulated boom assembly for penetrating the ground near a drainfield lateral or underneath a dry well to apply forced air or fluid or suction to agitate the area near the drainfield lateral or underneath the dry well.

37 Claims, 4 Drawing Sheets

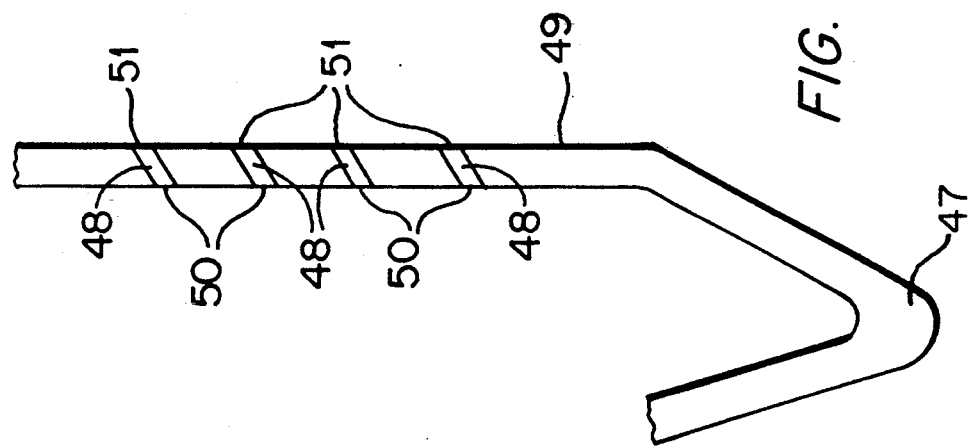
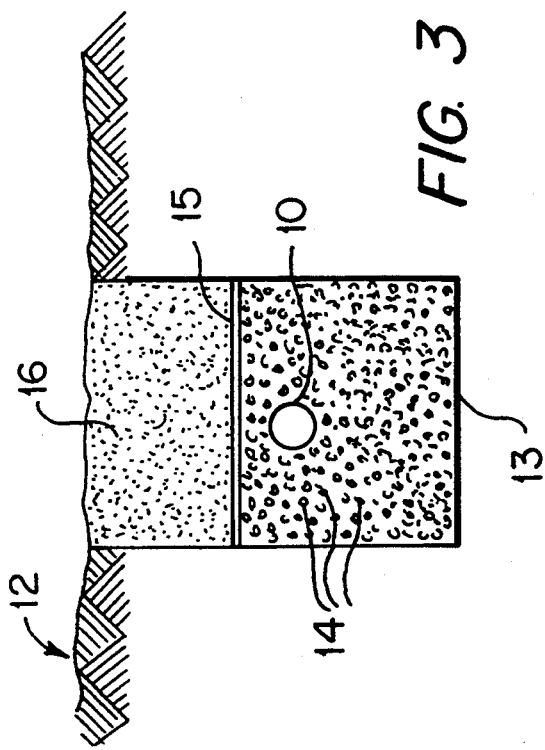
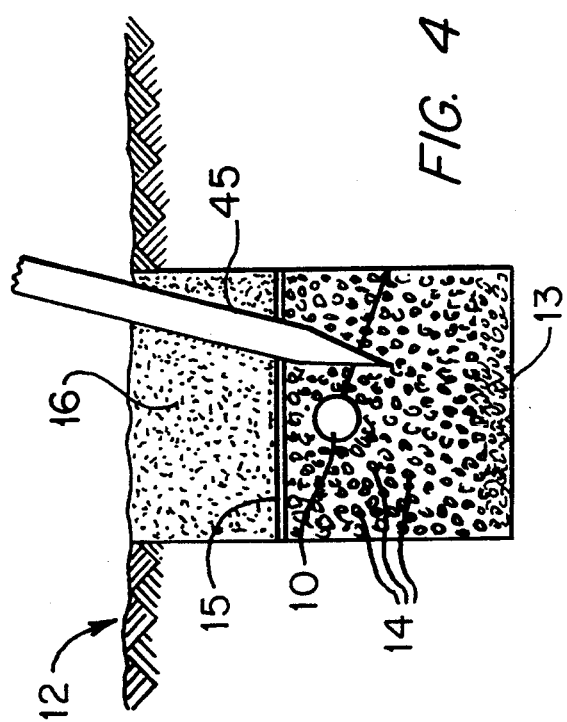

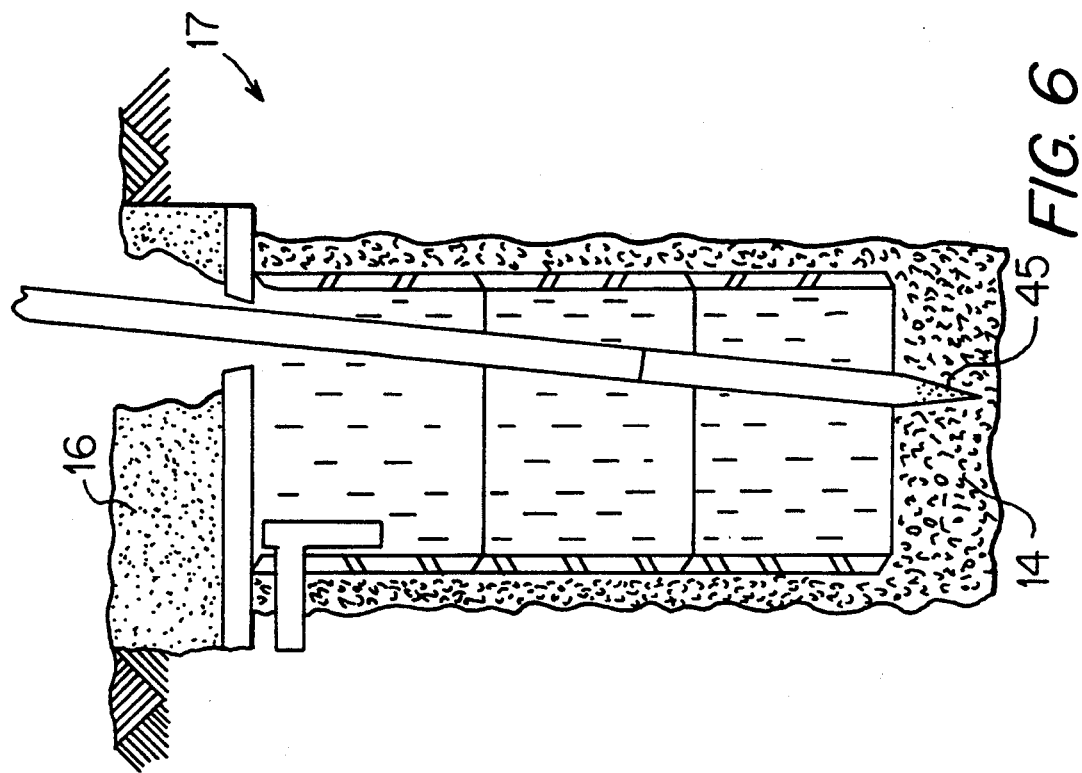
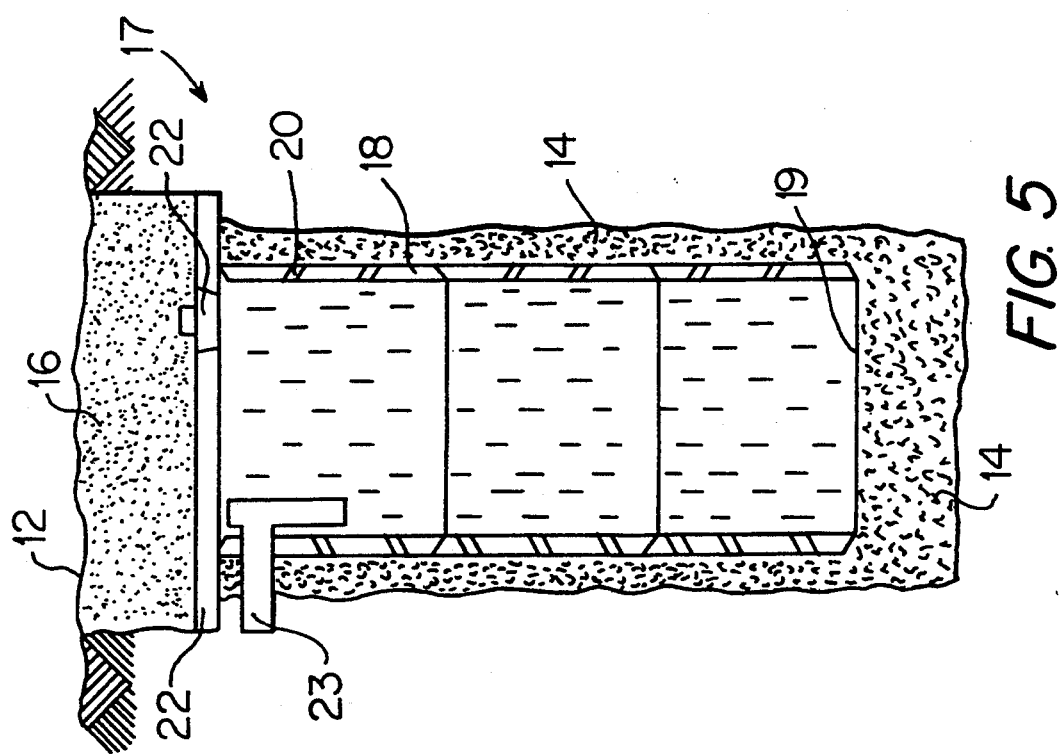

METHOD FOR REJUVENATING A DRAINFIELD OR DRY WELL

BACKGROUND OF THE INVENTION

The method and apparatus of the present invention relates to the cleaning and rejuvenation of septic tank drainfields or dry wells. The present invention makes possible more thorough cleaning of drainfields and dry wells than was possible utilizing prior art methods. The present invention includes both a method and an apparatus for performing the method.

SUMMARY OF THE INVENTION

In accordance with a first method of the present invention, a septic tank drainfield is cleaned and rejuvenated by gaining access to each of the underground drainfield laterals in the drainfield. Each underground drainfield lateral has perforations on the bottom thereof, and is located in a bed of gravel, crushed stone, sand or the like for drainage. Suction is applied at one end of the drainfield lateral to remove scum and accumulated waste therein.

Simultaneously with the suctioning of the drainfield lateral, the ground near the drainfield lateral is penetrated by the novel penetrating agitation apparatus of the present invention. The penetrating agitation apparatus comprises a nozzle attached to the end of an articulated, telescoping boom. The nozzle is made of a suitable material, such as hardened steel, and has a penetrating tip portion capable of penetrating both the ground and the gravel or crushed stone surrounding the drainfield lateral. Air, liquid, or an air and liquid mixture, is forced through the nozzle at relatively high pressure to agitate and loosen accumulated scum and waste located near the perforations of the drainfield lateral. The liquid used may be water, cleaning solution or other material. The loosened scum and waste is removed by the suction through the drainfield lateral. The drainfield is thereafter rejuvenated by applying a high quality bacterial product to the drainfield lateral.

The first method of the present invention thus results in more accumulated scum and waste being removed from a drainfield lateral than was heretofore possible using prior art methods, which employed suction alone or in combination with conventional water jetting procedures on the drainfield lateral.

In accordance with a second method of the present invention, a dry well is cleaned and rejuvenated by gaining access through the upper end of the dry well by removing the dry well cover. Water present in the dry well is removed by suction. The nozzle of the novel underground agitation equipment of the invention is penetrated into the gravel, crushed stone, or sand that comprises the bottom of the dry well at several locations along the bottom of the dry well. Air, liquid, or an air and liquid mixture, is forced through the nozzle at relatively high pressure to agitate and loosen accumulated scum and waste located near the bottom of the dry wall. The loosened scum and waste is thereby formed into a froth. The froth is removed by suction, which may be produced by reversing the air flow in the agitation equipment after lifting the nozzle out of the gravel or stone at the bottom of the dry well. Alternatively, the suction may be applied by conventional means. The dry well is thereafter rejuvenated by applying a high quality bacterial product to the dry well.

The second method of the present invention thus results in more accumulated scum and waste being removed from a dry well than was heretofore possible using prior art methods.

Accordingly, it is an object of the present invention to provide an improved method for cleaning and rejuvenating septic tank drainfields wherein more accumulated scum and waste is removed than heretofore possible.

It is a further object of the present invention to provide an improved method for cleaning and rejuvenating dry wells wherein more accumulated scum and waste is removed than heretofore possible.

It is a still further object of the present invention to provide novel penetrating agitation equipment to perform the method of the present invention.

These and other objects, as well as further aspects of the invention, will become apparent in the detailed description of the preferred embodiment of the invention.

BRIEF DESCRIPTION OF THE DRAWINGS

FIG. 3 is a cross sectional view of a drainfield lateral.

FIG. 4 is the same cross sectional view as in FIG. 3, showing penetrating agitation equipment in position near the drainfield lateral.

FIG. 5 is a cross sectional elevation of a typical dry well.

FIG. 6 is the same cross sectional view as in FIG. 5, showing penetrating agitation equipment in position under the bottom of the dry well.

FIG. 8 is a partial cross sectional view of the nozzle portion of the agitation equipment showing the perforations therein.

DETAILED DESCRIPTION OF THE PREFERRED EMBODIMENT

Figure 1:
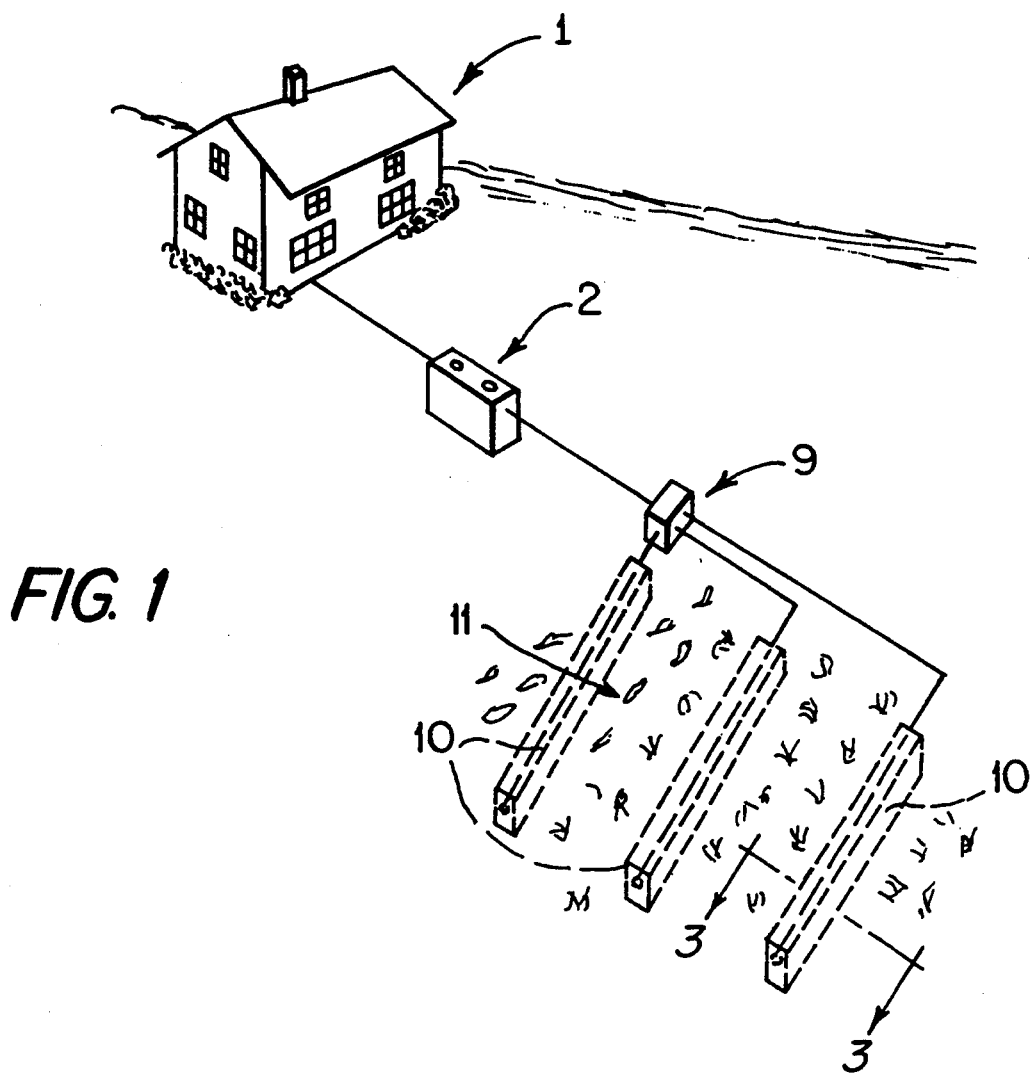
FIG. 1 is a schematic diagram of a typical drainfield septic tank system.
Figure 2:
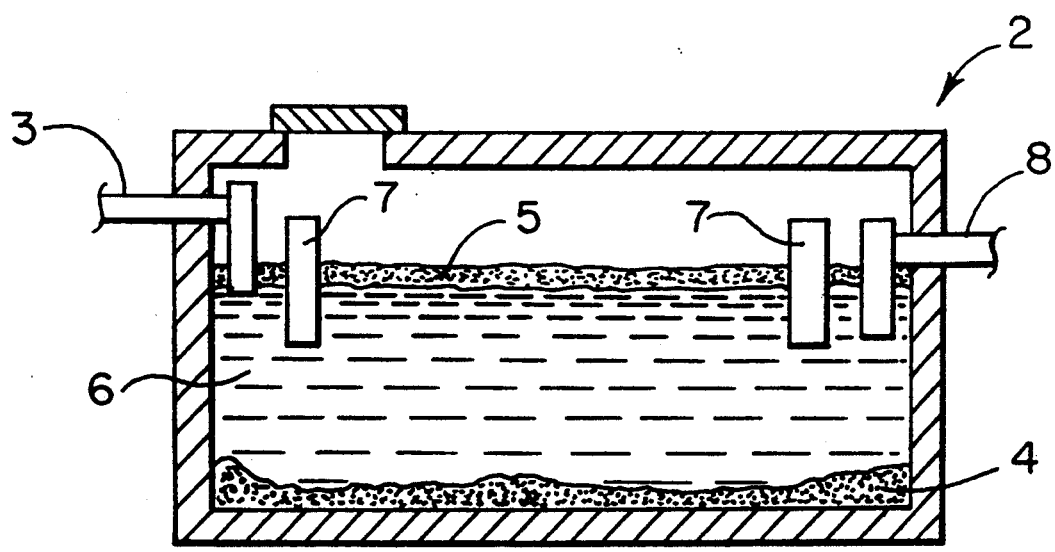
FIG. 2 is a schematic diagram of a typical septic tank.

Referring to FIGS. 1 and 2, a typical residential drainfield septic tank system includes one or more septic tanks 2 which receive waste products at inlet 3 thereof from a residence 1. Bacterial products in the septic tank 2 separate and remove a portion of the solid waste located in the waste stream. This solid waste falls to the bottom of the septic tank in the form of sludge 4. Additional solid waste forms a scum 5 which floats on the top of clear water waste 6. The clear water waste 6 exits septic tank 2 at outlet 8 thereof. Baffles 7 prevent much of the scum 5 from flowing out of outlet 8 of septic tank 2. However, some of the scum and other solid waste products will flow out of outlet 8 along with clear water waste 6.

Clear water waste 6 flows, by gravity, into underground distribution box 9, located at a point lower than outlet 8 of septic tank 2. The flow is directed at distribution box 9 to one or more drainfield laterals 10 shown schematically in FIG. 1. The drainfield laterals are located in drainfield 11, also known in the art as a tile field. Each drainfield lateral is comprised of a slightly downwardly sloping pipe typically having a diameter of, for example, about 4 inches, and which is typically, for example, about 50 feet long. Each drainfield lateral 10 has a plurality of perforations (not shown) at or near the bottom surface thereof such that clear water waste 6 may flow or seep out of the drainfield lateral 10 into drainfield 11.

Each drainfield lateral 10 is generally buried about 20 to 30 inches below ground level 12. In colder climates, drainfield lateral 10 may be buried a greater distance below ground level 12 to avoid freezing of the liquid in the pipe. As shown in FIG. 3, drainfield lateral 10 is located in a tile trench 13 surrounded by a bed of gravel or crushed stone 14 to allow water in the drainfield lateral 10 to escape through the perforations thereof. The gravel or crushed stone 14 is typically covered with a layer of untreated building paper or straw 15 which is covered with earth 16.

Rather than a distribution box and drainfield system, a typical septic tank system may alternatively have a dry well 17 located downstream of the outlet 8 of septic tank 2. As shown in FIG. 5, dry well 17 typically comprises a generally vertical cylinder 18 having an open end 19 at the bottom thereof. It will be understood by those skilled in the art that dry well 17 may have alternative configurations. Cylinder 18 is typically made of concrete or the like and may have perforations 20 in the sidewall thereof. The top of cylinder 18 is typically either at ground level 12 or buried, for example, up to about 5 feet beneath ground level 12, and rests in a bed of gravel, crushed stone, or sand 14. A top portion 21 of dry well 17 has a lid 22 to allow access to the dry well interior.

Clearwater waste 6, flowing from outlet 8 of septic tank 2, flows through inlet 23 of dry well 17 and partially dry well 17. The water then drains through open end 19 of cylinder 18 through the gravel, crushed stone, or sand 14. This flow of water out of the dry well is called perking.

In either the drainfield or the dry well type of system, scum and accumulated waste typically builds up over time inside drainfield lateral 10 and on gravel or crushed stone 14 adjacent the perforations therein, or inside dry well 17 and on the gravel, crushed stone, or sand 14 adjacent the bottom end thereof. If left untreated, this scum and accumulated waste can retard drainage of the septic tank system, which may cause undesirable back-ups in the system. If left untreated long enough, fluid flow may become so blocked that the entire septic tank system may have to be replaced. The present invention relates to removing this scum and accumulated waste before such back-ups can occur to thereby maintain the proper drainage function of the septic tank system and prolong its useful life.

The Inventive Apparatus

Figure 7:
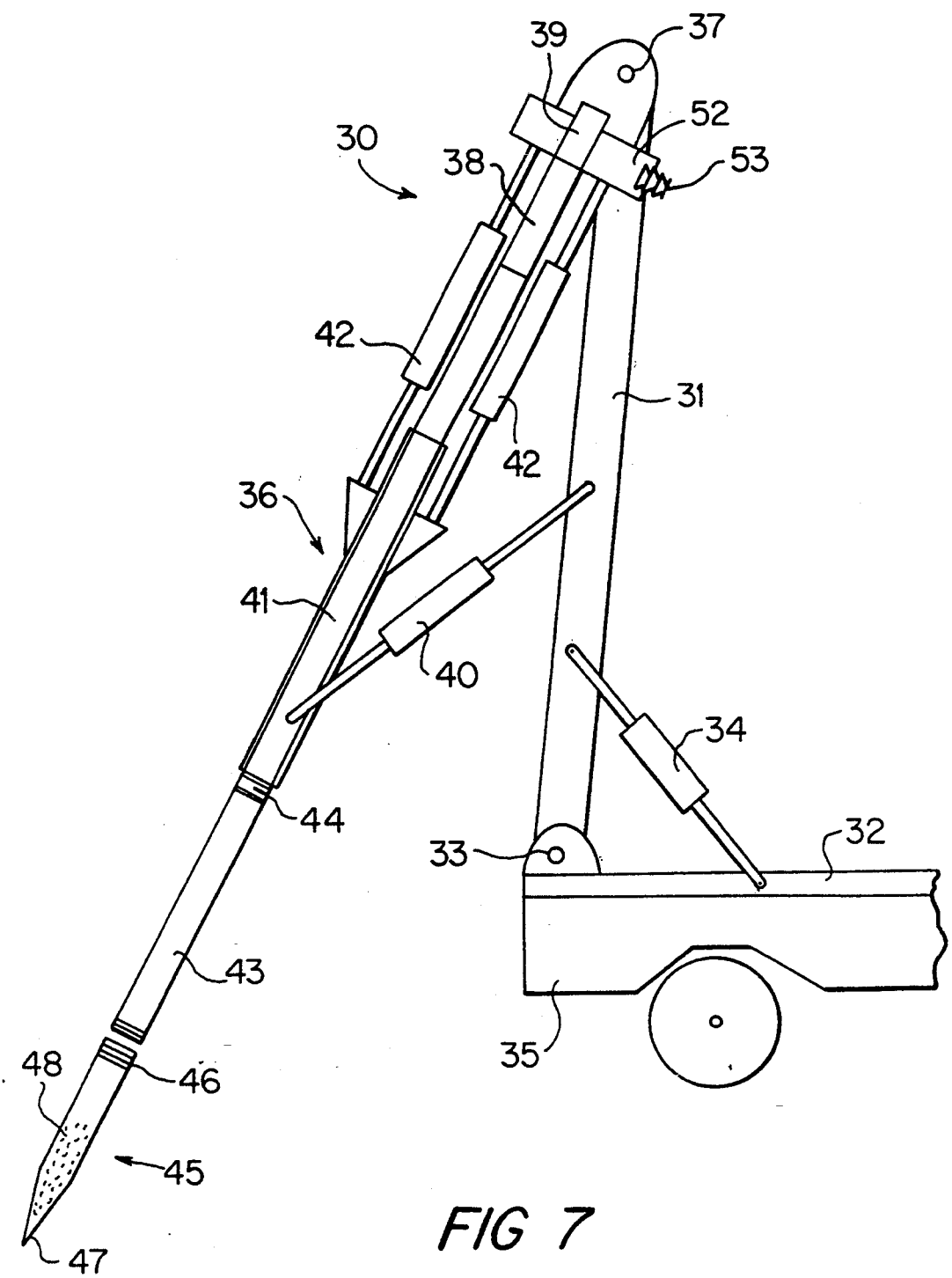
FIG. 7 is a side view of the novel penetrating agitation equipment of the present invention.

The novel penetrating agitation apparatus of the present invention can be understood with reference to FIG. 7. An articulated boom assembly 30 has a first section 31 pivotally attached to a platform 32 by means of pivoted articulation 33. Hydraulic ram 34 pivots first section 31 relative to platform 32. Platform 32 is adapted to be mounted on a vehicle 35. Alternatively, platform 32 may be adapted to be towed by a vehicle to the work site and released therefrom.

Articulated boom assembly 30 has a second section 36 pivotally attached to first section 31 at pivoted articulation 37. Second section 36 is comprised of upper tubular section 38 which may be made of one or more hollow tubular sections. Upper tubular section 38 is mounted on locking head 39. Hydraulic rams 42 are disposed between a hollow sleeve 41 and locking head 39. Sleeve 41 may telescopically slide longitudinally relative to upper tubular portion 38 under the force of hydraulic rams 42. Hydraulic ram 40 is disposed between first section 31 and sleeve 41 and pivots second section 36 relative to first section 31 of the articulated boom assembly.

Lower tubular section 43, which may be made up of one or more hollow tubular sections, is attached to sleeve 41 by, for example, a threaded connection 44. A pencil-like penetrating nozzle 45 is releasably attached to lower tubular section 43 by, for example, threaded connection 46. Penetrating nozzle 45 may be made of heavy gauge steel or other material suitable for penetrating earth and gravel, crushed stone, or sand, and has perforations 48 therein. Threaded connection 46 allows penetrating nozzle 45 to be interchanged with other penetrating nozzles having, for example, different sized or number of perforations 48.

A manifold 52 is provided at the top of upper tubular section 38. Manifold 52 has an inlet 53 thereof which is connected to a pump (not shown) which may be located on platform 32. Inlet 53 includes suitable connecting means such as a safety pin coupler, quick connect coupler, air lock, or the like. The pump is suitable for forcing air and or water at relatively high pressure, for example, at about 8" Hg, through manifold 52, upper tubular portion 38, sleeve 41, lower tubular portion 43, and perforations 48 in penetrating nozzle 45 so as to create a high pressure jet of air and/or water flowing from penetrating nozzle 45. The pump is also suitable for reversing flow to thereby draw a relatively high suction, for example, about 27" Hg, to draw air, water, scum, and/or other debris through the penetrating nozzle 45 and further up through the remainder of the apparatus to a tank (not shown) operatively connected to the pump.

As shown in FIG. 8, penetrating nozzle 45 has a solid penetration tip portion 47 at the bottom end thereof and a plurality of perforations 48 in the sidewall 49 thereof for allowing air, water, and/or scum and debris to pass therethrough. Perforations 48 may be of different diameter ranging from, for example, one eighth of an inch to three sixteenths of an inch, depending upon the size and type of gravel or crushed stone, or the amount or type of debris, in the drainfield or dry well to be cleaned. Each perforation 48 has an inner end 50 and an outer end 51. Outer ends 51 of each of the perforations 48 are located further from the penetration tip portion 47 than are inner ends 50 so that when penetrating nozzle 45 is pushed into the ground under the force of hydraulic rams 42, perforations 48 do not become blocked with dirt or other debris.

While the preferred embodiment of the apparatus of the present invention has been described, it will be apparent to one of ordinary skill in the art that many equivalent structures are possible. Alternative forms of articulated booms could be implemented. In addition, different types of penetrating nozzles may be used without departing from the scope of the invention. For example, a rotating auger-type penetrating nozzle could be mounted on the second section 36 of the articulated boom assembly 30, which could be made to rotate to penetrate the ground in corkscrew fashion according to means well known in the art. In addition, penetrating nozzle 45 could be made to vibrate to facilitate penetration into the ground and to avoid blockage of perforations 48.

The Inventive Method

The method of cleaning and rejuvenating a drainfield of the present invention can be understood with reference to FIGS. 1 and 4. Initially, the earth above distribution box 9 is removed and access is gained thereto through an opening provided for that purpose. Conventional water jetting may first be used to evacuate the drainfield lateral of scum and debris. The water jet device comprises a head connected to a hose. The head is forced through the length of the drainfield lateral by water at high pressure. The water jet loosens much of the accumulated waste, scum and debris built up inside each drainfield lateral 10. After or simultaneously with the water jetting procedure, a conventional vacuum may be applied to the drainfield lateral to remove loosened waste, scum, and debris.

Simultaneously with the application of suction as described above, articulated boom assembly 30 is positioned nearby the drainfield lateral 10 in which the suction procedure is being performed. Penetrating nozzle 45 is forced through earth 16, by for example, the force of hydraulic rams 42. Penetrating nozzle 45 pierces the unfinished building paper or straw 15 and penetrates into gravel, crushed stone, or sand 14 near drainfield lateral 10 as shown in FIG. 4. Air is then forced at relatively high pressure, for example, about 8" Hg, by the pump (not shown) through manifold 52, tubular sections 38 and 43, and the perforations 48 of penetrating nozzle 45 to thereby agitate the gravel, crushed stone, or sand near the perforations (not shown) of the drainfield lateral 10. This agitation causes more scum and accumulated waste or debris to be removed from the drainfield lateral 10 and trench 13 than would be removed by conventional water jetting and suction alone. Boom assembly 30 may be positioned at various points along drainfield lateral 10 during the procedure, for example, every 10 or 20 feet, to agitate different portions of trench 13 along the length of drainfield lateral 10.

In addition to forcing air at high pressure through perforations 48, a water and air mixture may be forced therethrough to further agitate the area around drainfield lateral 10. Also, a suction may be applied by the pump in alternating fashion with the forcing of air or air and water to further aid in agitation and removal of scum and accumulated waste.

It will be appreciated from the above description that variations in the inventive method may be effective in a particular application. For example, water jetting and suction of the drainfield lateral may be applied before, during, and/or after agitation by the penetrating nozzle 45. In addition, it may be desirable to alternate agitation by the penetrating nozzle 45 with water jetting and/or suction of the drainfield lateral.

After cleaning of drainfield lateral 10 has been performed according to the process described above, a high quality bacterial agent such as, for example, Zep-0-Zyme TM manufactured by Zep Manufacturing Company, is injected into drainfield lateral 10. The bacterial agent creates enzymes which aid the process of breaking down solid waste, thereby rejuvenating the drainfield lateral system.

Where the residential septic tank system to be cleaned and rejuvenated according to the present invention includes a dry well 17 rather than drainfield laterals, the method may be understood with reference to FIG. 6. Access is gained to dry well 17 by removing earth 16 to expose lid 22, which is then removed. Water is removed from dry well 17 by suction either by the novel apparatus of the present invention or by other conventional suction means to expose gravel or crushed stone 14 at the bottom of the well. Penetrating nozzle 45 is then made to penetrate gravel, crushed stone, or sand 14, and air at relatively high pressure, for example, about 8" Hg, is forced through perforations 48 to agitate the gravel, crushed stone, or sand at the bottom of the well.

The agitation causes accumulated scum and waste to form a malt or froth at the bottom of dry well 17. This froth may then be removed by suction either by raising the level of penetrating nozzle 45 above the level of gravel, crushed stone, or sand 14 and applying suction from the pump (not shown), or by applying suction by other conventional means. The agitation and suction procedure is repeated until gravel, crushed stone or sand 14 appear to be relatively free from accumulated scum and waste.

In addition to air, an air and water mixture may be forced through perforations 48 in penetrating nozzle 45 to facilitate formation of the froth. In addition, suction may be applied to penetrating nozzle 45 in alternating fashion with forced air to further agitate gravel or crushed stone 14 to thereby loosen accumulated scum or waste.

After dry well 17 is cleaned in accordance with the above described procedure, it may be rejuvenated by addition of a high quality cultured bacteria product as described above.

It will be apparent to one of ordinary skill in the art from the foregoing description that variations of the foregoing method may be employed without departing from the scope of the present invention. In addition, dimensions and measurements are given by way of example only, and are merely representative of the various modes of the invention.

What is claimed is:

1. A method of cleaning a septic tank drainfield including at least one underground drainfield lateral having perforations therein, comprising the steps of:
   gaining access to one end of said drainfield lateral;
   applying suction at said one end of said drainfield lateral to clear said drainfield lateral of accumulated waste; and
   penetrating the ground and applying underground agitation with an underground agitation means at a location near said drainfield lateral whereby additional accumulated waste is loosened and cleared by said suction.

2. The method of claim 1, further comprising the step of applying a high quality cultured bacteria product to said drainfield lateral.

3. The method of claim 1, wherein said penetration and underground agitation step comprises:
   penetrating the ground with a perforated nozzle means;
   locating said nozzle means at a location near said drainfield lateral; and
   forcing air at relatively high pressure through said nozzle means whereby the area near said drainfield lateral is agitated.

4. The method of claim 3, wherein said underground agitation step further comprises:
   applying a relatively high suction to said nozzle means in alternating fashion with said forcing air at relatively high pressure through said nozzle means.

5. The method of claim 4, wherein said forcing air step further comprises forcing liquid in addition to air through said nozzle means.

6. The method of claim 3, Wherein said forcing air step further comprises forcing liquid in addition to air through said nozzle means.

7. The method of claim 3 wherein said nozzle means is a rotating auger type nozzle.

8. The method of claim 3 wherein said nozzle means is caused to vibrate, whereby penetration of the ground is facilitated.

9. The method of claim 1, wherein said penetration and underground agitation step comprises:
 penetrating the ground with a perforated nozzle means;
 locating said nozzle means at a location near said drainfield lateral; and
 forcing liquid at relatively high pressure through said nozzle means whereby the area near said drainfield lateral is agitated.

10. The method of claim 9, wherein said underground agitation step further comprises:
 applying a relatively high suction to said nozzle means in alternating fashion with said forcing liquid at relatively high pressure through said nozzle means.

11. The method of claim 9 wherein said nozzle means is a rotating auger type nozzle.

12. The method of claim 9 wherein said nozzle means is caused to vibrate, whereby penetration of the ground is facilitated.

13. The method of claim 1, wherein said suction and said underground agitation are applied in alternating fashion.

14. A method of cleaning a dry well, comprising the steps of:
 gaining access to the upper end of said dry well;
 removing water present in said dry well;
 penetrating the bottom end of said dry well with an underground agitation means;
 agitating the ground underneath said bottom end of said dry well with said underground agitation means to loosen accumulated waste; and
 removing said accumulated waste loosened by said agitating.

15. The method of claim 14, further comprising the step of applying a high quality cultured bacteria product to said dry well.

16. The method of claim 14, wherein said underground agitation means comprises a perforated nozzle means.

17. The method of claim 16, wherein said agitating step comprises:
 forcing air at relatively high pressure through said perforated nozzle means whereby the area underneath said dry well is agitated to loosen said accumulated waste.

18. The method of claim 17, wherein said forcing air step further comprises forcing liquid in addition to air through said nozzle means.

19. The method of claim 17, wherein said agitating step further comprises:
 applying a relatively high suction to said perforated nozzle means in alternating fashion with said forcing air at relatively high pressure through said nozzle means.

20. The method of claim 19, wherein said forcing air step further comprises forcing liquid in addition to air through said nozzle means.

21. The method of claim 16, wherein said accumulated waste loosened by said agitating is formed into a froth; and the step of removing said accumulated waste loosened by said agitating comprises:
 raising said perforated nozzle to a level above the bottom end of said dry well; and
 applying a relatively high suction to said perforated nozzle means to remove said froth from said dry well.

22. The method of claim 16, wherein said agitating step comprises:
 forcing liquid at relatively high pressure through said perforated nozzle means whereby the area underneath said dry well is agitated to loosen said accumulated waste.

23. The method of claim 22, wherein said agitating step further comprises
 applying a relatively high suction to said perforated nozzle means in alternating fashion with said forcing liquid at relatively high pressure through said nozzle means.

24. A method of cleaning a septic tank drainfield including at least one underground drainfield lateral having perforations therein, comprising the steps of:
 gaining access to one end of said drainfield lateral;
 water jetting said drainfield lateral to clear said drainfield lateral of accumulated waste; and
 penetrating the ground and applying underground agitation with an underground agitation means at a location near said drainfield lateral whereby additional accumulated waste is loosened and cleared by said water jetting.

25. The method of claim 24, further comprising the step of applying a high quality cultured bacteria product to said drainfield lateral.

26. The method of claim 24, wherein said penetration and underground agitation step comprises:
 penetrating the ground with a perforated nozzle means;
 locating said nozzle means at a location near said drainfield lateral; and
 forcing air at relatively high pressure through said nozzle means whereby the area near said drainfield lateral is agitated.

27. The method of claim 26, wherein said underground agitation step further comprises:
 applying a relatively high suction to said nozzle means in alternating fashion with said forcing air at relatively high pressure through said nozzle means.

28. The method of claim 27, wherein said forcing air step further comprises forcing liquid in addition to air through said nozzle means.

29. The method of claim 26, wherein said forcing air step further comprises forcing liquid in addition to air through said nozzle means.

30. The method of claim 26 wherein said nozzle means is a rotating auger type nozzle.

31. The method of claim 26 wherein said nozzle means is caused to vibrate, whereby penetration of the ground is facilitated.

32. The method of claim 24, wherein said penetration and underground agitation step comprises:
 penetrating the ground with a perforated nozzle means;

locating said nozzle means at a location near said drainfield lateral; and forcing liquid at relatively high pressure through said nozzle means whereby the area near said drainfield lateral is agitated.

33. The method of claim 32, wherein said underground agitation step further comprises:

applying a relatively high suction to said nozzle means in alternating fashion with said forcing liquid at relatively high pressure through said nozzle means.

34. The method of claim 32 wherein said nozzle means is a rotating auger type nozzle.

35. The method of claim 32 wherein said nozzle means is caused to vibrate, whereby penetration of the ground is facilitated.

36. The method of claim 24, wherein said water jetting and said underground agitation are applied in alternating fashion.

37. A method of cleaning a septic tank drainfield including at least one underground drainfield lateral having perforations therein, comprising the steps of:

gaining access to one end of said drainfield lateral;

applying suction at said one end of said drainfield lateral to clear said drainfield lateral of accumulated waste;

water jetting said drainfield lateral to clear said drainfield lateral of accumulated waste; and penetrating the ground and applying underground agitation with an underground agitation means at a location near said drainfield lateral whereby additional accumulated waste is loosened and cleared by said suction and said water jetting.

* * * * *